Figure 1:
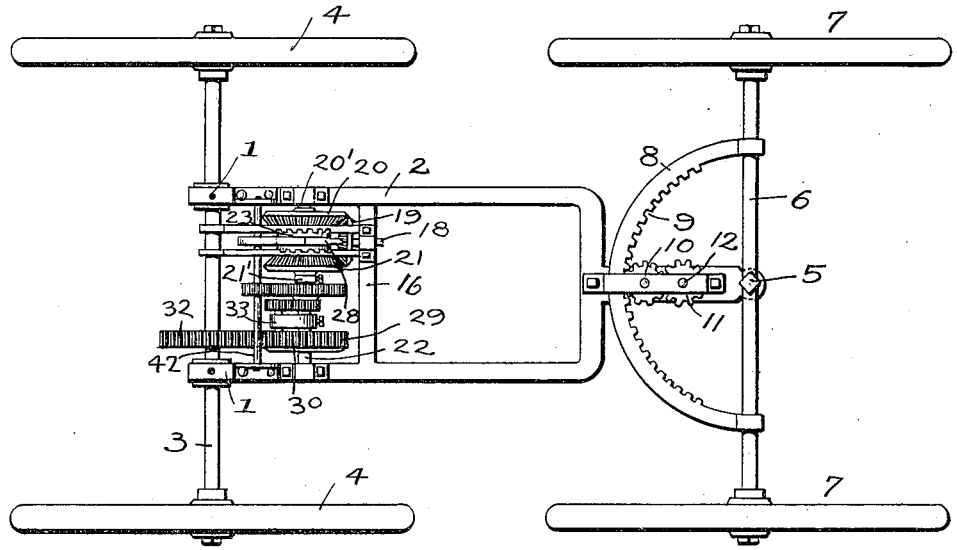

No. 661,964. Patented Nov. 20, 1900.
R. W. ELSTON.
DRIVING GEAR FOR MOTOR VEHICLES.
(Application filed Mar. 14, 1898.)

(No Model.) 2 Sheets—Sheet 1.

Witnesses:
C. H. Schafer
A. Reynolds

Inventor:
Robert W. Elston
By his Atty. C. J. Webster

No. 661,964. Patented Nov. 20, 1900.
R. W. ELSTON.
DRIVING GEAR FOR MOTOR VEHICLES.
(Application filed Mar. 14, 1898.)
(No Model.) 2 Sheets—Sheet 2.
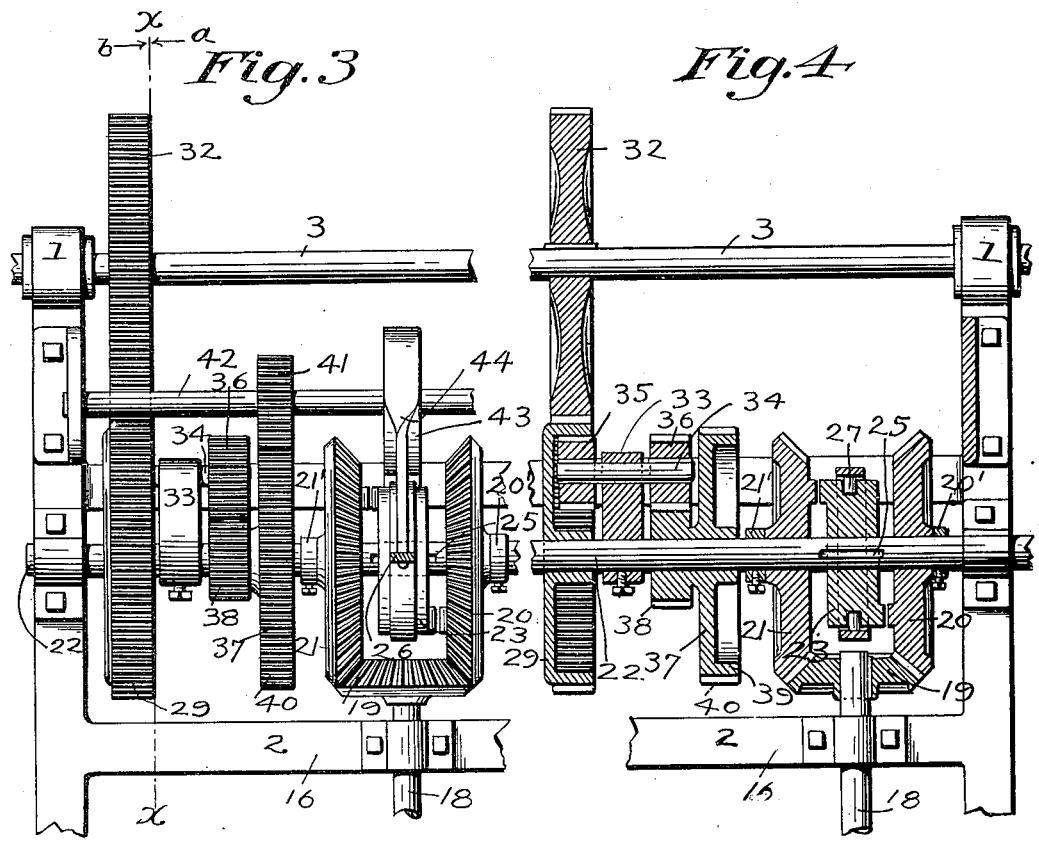
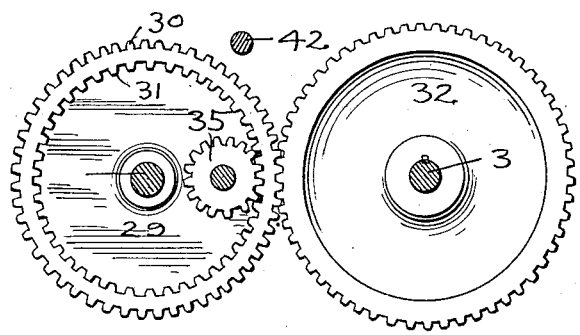
Witnesses:—
C. H. Schafer
A. Reignolds
Inventor
Robert W. Elston
By his Atty.
C. J. Webster
THE NORRIS PETERS CO., PHOTO-LITHO., WASHINGTON, D. C.

UNITED STATES PATENT OFFICE.

ROBERT W. ELSTON, OF CHARLEVOIX, MICHIGAN.

DRIVING-GEAR FOR MOTOR-VEHICLES.

SPECIFICATION forming part of Letters Patent No. 661,964, dated November 20, 1900.

Application filed March 14, 1898. Serial No. 673,847. (No model.)

*To all whom it may concern:*

Be it known that I, ROBERT W. ELSTON, of Charlevoix, in the State of Michigan, have invented certain new and useful Improvements in Driving-Gear for Motor-Vehicles, of which the following is a specification, reference being had to the accompanying drawings, forming a part thereof.

This invention relates to improvements in driving-gear or mechanism, and is particularly adapted for use in a motor-vehicle, although it is equally capable of use for the transmission of power in any other situation where the peculiar characteristics of my invention may prove desirable and beneficial adjuncts to the ordinary driving mechanism.

The primary object of my invention is a variable-speed or speed-changing driving-gear whereby the speed of rotation of the driven shaft may be changed at the will of the operator during the continuous rotation of the driving or power shaft and without regard to the speed at which the driving-shaft may be rotating or whether such speed remains constant and uniform or varies from the maximum to the minimum. In other words, I propose to render the speed of the driven shaft directly independent of and uncontrollable by that of the driving-shaft and yet absolutely and readily controllable by and at the will of the operator, while the driving-shaft rotates uninterruptedly.

Another object of my invention is to have the speed-changing mechanism of such character that during the continuous rotation of the driving-shaft the speed of rotation of the driven shaft may be varied at the will of the operator and increased or decreased from the minimum to the maximum, and vice versa, without unshipping, disconnecting, or in any wise interrupting the gear connections between the driving and the driven shafts or breaking the continuity of the transmission of speed and power from the driving to the driven shafts.

A further object is to not only have the speed of rotation of the driven shaft changeable at the will of the operator during the continuous rotation of the driving-shaft, but to also have the direction of rotation of the driven shaft changeable during the continuous rotation of the driving-shaft in one direction and yet retain the capability of speed changing regardless of the direction in which the driven shaft may be rotating.

These and such other objects as may hereinafter appear are attained by the devices illustrated in the accompanying drawings, in which—

Figure 2:
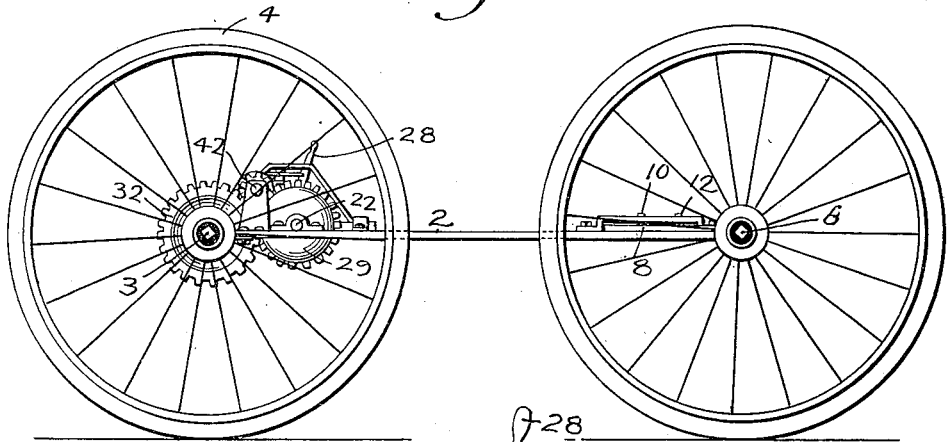
Figure 6:
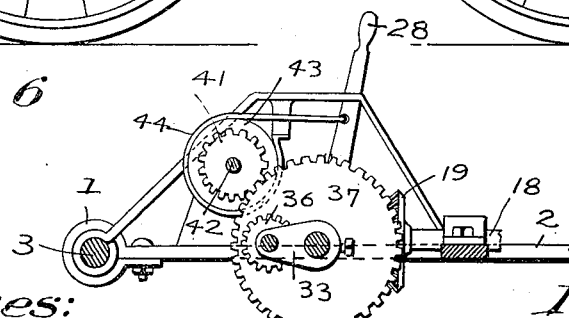

Figure 1 represents a plan view of the working parts of a motor-vehicle embodying my invention. Fig. 2 is a side elevation of the same. Fig. 3 is a detailed plan view of the driving mechanism. Fig. 4 is a horizontal sectional view of the same. Fig. 5 is a transverse vertical section on the line X X of Fig. 3 looking in the direction indicated by the arrow $a$, and Fig. 6 is a similar sectional view on the same line looking in the direction of the arrow $b$.

Similar numerals of reference denote the same parts in the several figures of the drawings.

While my invention is capable of use in any situation for the transmission of power and speed from a driving to a driven shaft, I will herein illustrate and describe the same in connection with a motor-vehicle as a familiar illustration of one of the most advantageous uses thereof.

Referring now by numerals to the accompanying drawings, let 2 indicate the frame of the vehicle, having suitable bearings 1 at the rear end of the frame, in which is journaled the rear axle 3 of the vehicle, upon which is secured the driving-wheels 4. At the forward end of the frame, by means of an ordinary king-bolt 5, is pivotally secured the forward axle 6 of the vehicle, upon which is journaled the wheels 7, there being secured to said axle a semicircular ring 8, which is toothed, as at 9, and with which engages a pinion 10, rotated by an engaging pinion 11, secured to the lower end of a vertically-disposed shaft 12. This shaft is rotated by any suitable means arranged in convenient reach of the operator, such as a crank-handle, whereby the pinions 10 and 11 may be rotated and the angle of the forward shaft consequently changed with reference to the frame of the machine, thus affording a ready means for guiding the machine in the desired direction. None of these features form any part of my present invention, however, being simply illustrated and described for a clear understanding of my invention when applied to a motor-vehicle.

Journaled in suitable bearings carried by the cross-piece 16 of the frame 2 is a driving or power shaft 18, which is designed to have a continuous rotation in one direction regardless of the direction in which the driven shaft is to be rotated or the direction in which the motor-vehicle is traveling when my invention is applied thereto. Obviously, however, so far as relates to the broad idea of my invention this shaft may be rotated in either direction, according to the direction in which it is desired that the driven shaft shall be rotated, motion being imparted to the driving-shaft by any well-known form of engine or motor. I may here state, however, that my speed changing or varying mechanism will operate just the same whether the reversal in the direction of rotation of the mechanism is caused by reversing the motor or engine or is brought about by the mechanism hereinafter described for accomplishing this purpose without changing the direction of rotation of the driving-shaft, although the latter mode of operation is preferred, because the operator is relieved of the otherwise special duty of reversing the motor when he desires to reverse the direction of rotation of the driven shaft. It will be understood that in the embodiment of my invention in a motor-vehicle, as illustrated in the drawings, the driven shaft will be the rear axle 3 of the motor-vehicle.

Mounted upon the rear end of the driving-shaft 18 is a beveled gear 19, which meshes upon opposite sides with similar beveled gear-wheels 20 and 21, loosely mounted upon a shaft 22, held from longitudinal movement by collars 20' and 21', though free to rotate in its bearings in either direction under the influence of one of the beveled gears 20 or 21, which beveled gears of course have rotation imparted thereto from the driving-shaft in opposite directions. Consequently when the clutch-sleeve 23, located between the gear-wheels 20 and 21 and having interlocking or engaging projections or teeth upon its opposite faces adapted and arranged to engage corresponding devices upon the opposing faces of the gear-wheels 20 and 21, is moved from its central non-engaging position into engagement with either of the gear-wheels 20 or 21 it revolves the same therewith, which determines the direction of rotation of the shaft 22. The clutch-sleeve is splined upon the shaft 22, so that while it is free to have longitudinal movement upon said shaft it must rotate in unison therewith. Longitudinal movement of the clutch-sleeve upon the shaft is obtained by means of a clutch-lever 26, having a bifurcated end carrying pins 27, which engage a groove in the clutch-sleeve, the opposite end of the clutch-lever being controlled by a handle 28, the upper end of which projects within easy reach of the operator upon the machine. It will thus be seen that the speed of rotation of the power or driving shaft 18 is communicated to the shaft 22 and causes the latter to rotate in either direction desired, according to the manipulation of the hand-lever 28, as will be readily understood.

Loosely journaled upon the shaft 22 is a disk 29, having a circumferential flange extending laterally therefrom concentric to the shaft, upon which flange are external and internal gear-teeth 30 and 31, respectively. Secured upon the rear axle 3, or, in other words, upon the driven shaft, is a gear-wheel 32, the teeth of which mesh with the teeth 30 upon the disk 29, whereby when the disk is revolved the rear axle or driven shaft revolves. Secured to the shaft 22, so as to revolve therewith, is an arm 33, in the free end of which is journaled a stub-shaft 34, having secured upon each end thereof, so as to revolve therewith, pinions or gear-wheels 35 and 36, respectively. The gear-wheel 35 meshes with the internal gear-teeth 31 on the disk 29. Loosely journaled upon the shaft 22 is another disk 37, the hub of which extends to one side thereof and is toothed to form a pinion 38, the teeth of which mesh with the teeth of the gear-wheel 36. The disk 37 is provided with a peripheral flange 39, concentric with the shaft 22, which flange is toothed upon its periphery, as at 40, said teeth meshing with a gear-wheel 41, secured upon a counter-shaft 42, journaled in suitable bearings upon the frame of the machine. Mounted upon the shaft 42 is a friction-disk 43, around which passes a friction-band 44, controlled by the hand-lever 28, whereby it acts as a brake to stop or allow the rotation of the friction-disk 43, and consequently of the disk 37, upon the shaft 22.

In operation, assuming the mechanism to be applied to a vehicle and the vehicle to be at a standstill, the friction of the driving-wheels 4 upon the ground, due to the weight thereof and of the vehicle, will be sufficient to hold the disk 29 against rotation when the brake-strap 44 is loose upon the friction-disk 43. This would likewise be true if a weight or any other resisting force were applied to the driven shaft 3. Under these circumstances when the driving or power shaft is put into operation it may continue to rotate without causing any movement of any of the mechanism, so long as the clutch-sleeve remains in its mid or non-engaging position. When, however, the clutch-sleeve is shifted into engagement with one or the other of the beveled gears 20 or 21, a rotation in a corresponding direction will be imparted to the shaft 22 and in unison therewith a revolution will be imparted to the arm 33. As the disk 29 is held against rotation, as previously described, the pinion 35, meshing with the internal gear thereon, will revolve around within said disk, thereby causing a like revolution of the pinion 36 and the axial rotation of said wheel, which, through the intermediary of the pinion 38, causes the disk 37 to revolve and likewise the friction-disk 43. This operation of the gearing, however, produces no effect upon the driven shaft or rear axle 3. When, however, it is desired to start the vehicle or the driven shaft, the friction-band is applied gradually to the friction-wheel 43, which retards the rotation thereof of the disk 37 and of the gear-wheels 35 and 36, thus causing a proportional part of the revolution of the arm 33 to be exerted upon the disk 29 through the gear 35, and consequently to the rear axle 3 or the driven shaft. It will thus be seen that the lighter the friction-band is applied the faster the friction-wheel will travel, and the faster the friction-wheel travels the slower the vehicle travels or the driven shaft will revolve, and vice versa, so that if the friction-band is applied with slight pressure to the friction-disk 43 the rotation of said disk will be but slightly retarded, and consequently the axle 3 or the driven shaft will have but a correspondingly slight rotation and the vehicle will be propelled at a reduced rate of speed; but as the pressure upon the friction-wheel is increased, so as to more and more retard or decrease the speed of rotation of the friction-wheel, and consequently of the disk 37, the speed of rotation of the disk 29, and consequently of the axle 3 or the driven shaft, will be correspondingly increased or accelerated.

In practice I have found the best results to be obtained by gearing or speeding the mechanism high enough to reach the desired maximum speed of rotation of the driven shaft when the speed of rotation of the disk 37 has been retarded so as to rotate in unison with the shaft 22. By this proportioning of the gears the disks 37 and 29 and the pinions 35, 36, and 38 all revolve with shaft 22, but without axial rotation of the pinions 35 and 36, which are carried around by the arm 33, which is rigid on the shaft 22, and in point of fact these pinions serve to convert the arm 33 into a crank-arm for imparting its full revolution to the disk 29, and consequently to the driven shaft. Thus when the gearing is proportioned as last described and the driving-shaft is running at its maximum speed and the driven shaft is at a standstill then the gears from pinion 35 to the friction-disk run at their maximum speed, and as the speed of the driven shaft is increased from a standstill to its highest speed so the gears 35 and 36 will rotate slower and slower until they stand still while doing their fullest work.

If desired, I may dispense with the friction-wheel 43 and form the periphery of the disk 37 to receive the friction-band. By means of the hand-lever connection one lever is all that is required to control the forward or backward direction and speed of the vehicle, as the movement of the lever longitudinally of the vehicle will operate the friction-band and the movement of the lever laterally of the vehicle will operate the clutch-sleeve. It will thus be seen that my invention affords a permanent gear connection between the driving and the driven shafts of such character that the driving-shaft may be continuously rotated in either direction while the speed of rotation of the driven shaft may be changed at the will of the operator. Such a mechanism avoids all shock in changing speeds, while giving the widest possible range in degree of variation as well as avoiding all danger of stripping the teeth of the gearing when the speed is changed without stopping the motor, and in fact generally economizing in the cost of operation, because of the obviation of the necessity for surplus motive power in starting up from a standstill.

Another important object is that in case the vehicle should collide with another or with any solid obstruction if the vehicle is strong enough to stand the shock the machinery would not be injured by the sudden stopping of the vehicle, as the friction-band would of course slip, if not released or sufficiently slackened, and the power of the driving-shaft would simply be utilized in running the friction-wheel free without transmitting any power to the driven shaft.

Of course so far as relates to the broad idea of my invention it is immaterial whether the motor and driving-shaft are reversed in order to reverse the direction of rotation of the driven shaft or whether means be provided, substantially as described, whereby the motor may be allowed to operate continuously and the driving-shaft be rotated continuously in one direction and yet the direction of rotation of the driven shaft be readily reversed, for my speed-varying mechanism, by reason of its maintaining a permanent and unbroken gear connection between the driving and the driven shafts, may be operated in either direction without in any wise affecting the operation thereof.

Having thus fully described my invention, what I claim, and desire to secure by Letters Patent, is—

1. The combination with a driving and a driven shaft, an intermediate shaft connected with, and driven by, the driving-shaft, means for changing and controlling the direction of revolution of the intermediate shaft and an arm rigid upon said intermediate shaft, of a friction-wheel, a gear connection between said arm and the driven shaft and between said arm and the friction-wheel and means for controlling the speed of rotation of the friction-wheel whereby the speed of rotation of the driven shaft may be varied, substantially as described.

2. The combination with a driving and a driven shaft, an intermediate shaft connected with, and driven by, the driving-shaft and an arm rigid upon said intermediate shaft, of a pair of pinions loosely journaled in said arm, a toothed disk loosely mounted upon said shaft and meshing with one of said pinions, said disk being geared with the driven shaft, another disk loosely mounted upon the intermediate shaft and meshing with the other one of said pinions and a friction device for controlling the speed of rotation of said last-mentioned disk, substantially as described.

3. The combination with a driving and a driven shaft, an intermediate shaft connected with, and driven by, the driving-shaft, means for changing and controlling the direction of revolution of the intermediate shaft and an arm rigid upon said intermediate shaft, of a pair of pinions loosely journaled in said arm, a toothed disk loosely mounted upon said shaft and meshing with one of said pinions, said disk being geared with the driven shaft, another disk loosely mounted upon the intermediate shaft and meshing with the other one of said pinions and a friction device for controlling the speed of rotation of said last-mentioned disk, substantially as described.

4. The combination with a driving and a driven shaft, an intermediate shaft connected with, and driven by, the driving-shaft and an arm rigid upon said intermediate shaft, of a pair of pinions loosely journaled in said arm, a toothed disk loosely mounted upon said shaft and meshing with one of said pinions, said disk being geared with the driven shaft, another disk loosely mounted upon the intermediate shaft and meshing with the other one of said pinions, a counter-shaft, a gear connection between said shaft and the last-mentioned disk, a friction-wheel also mounted on said shaft and a friction-band for controlling the speed of rotation of said wheel, substantially as described.

5. The combination with a driving and a driven shaft, an intermediate shaft connected with, and driven by, the driving-shaft, an arm secured to said intermediate shaft, a stub-shaft journaled in the outer end of said arm and a pair of pinions secured upon the ends, respectively, of said stub-shaft, of a disk loosely journaled upon the intermediate shaft, said disk having a flange toothed externally and internally the external teeth affording a gear connection with the driven shaft, and the internal teeth meshing with one of said pinions, the other pinion meshing with a third pinion, a disk also loosely journaled upon the intermediate shaft and carrying the last-mentioned pinion, said disk being toothed externally, a counter-shaft geared with said external teeth a friction-wheel secured upon said shaft, a friction-band encircling the friction-wheel and means for operating the friction-band, substantially as described.

6. The combination of a loosely-journaled shaft 22, means for controlling the direction of rotation of the shaft, a driven shaft, a gear-wheel secured thereon, a disk loosely journaled upon the shaft 22, said disk having a flange toothed externally and internally, the external teeth engaging with the teeth of the gear-wheel upon the driven shaft, an arm secured to the shaft 22, a stub-shaft journaled in the outer end thereof, a pinion secured upon each end of the stub-shaft, the teeth of one of the pinions meshing with the internal teeth of the flange of the disk upon the shaft 22, the opposite pinion meshing with a third pinion, a disk loosely journaled upon shaft 22 and carrying the last-mentioned pinion, said disk being toothed externally, a shaft 42, a gear-wheel secured thereon meshing with the teeth of the disk 37, a friction-wheel secured upon the shaft 42, a friction-band encircling the friction-wheel, and means for operating the friction-band, substantially as described.

7. The combination with a loosely-journaled shaft, and means for changing the direction of rotation thereof, of an arm secured upon the shaft, a driven shaft, mechanism interposed between the same and the said arm, a shaft 42 having a friction-wheel secured thereon and intermediate mechanism connecting the arm and said shaft, a friction-band encircling the friction-wheel and means for operating the band, substantially as described.

In testimony whereof I affix my signature in presence of two witnesses.

ROBERT W. ELSTON.

Witnesses:
EDITH M. HAWKINS,
GEO. W. CROUTER.